United States Patent [19]

Quon

[11] 4,036,536

[45] July 19, 1977

[54] WHEEL SLIP CONTROL SYSTEM ADAPTED TO USE ON LOW COEFFICIENT SURFACES

[75] Inventor: Donald S. Quon, St. Louis County, Mo.

[73] Assignee: Wagner Electric Corporation, Parsippany, N.J.

[21] Appl. No.: 705,662

[22] Filed: July 15, 1976

[51] Int. Cl.² .............................................. B60T 8/02
[52] U.S. Cl. ...................................... 303/96; 303/97; 303/105
[58] Field of Search .................. 303/105, 106, 96, 97, 303/98, 99, 20, 110; 317/5

[56] References Cited

U.S. PATENT DOCUMENTS

| | | | |
|---|---|---|---|
| 3,790,227 | 2/1974 | Dozier | 303/105 |
| 3,951,467 | 4/1976 | Fleagle | 303/20 |

Primary Examiner—Trygve M. Blix
Assistant Examiner—Reinhard J. Eisenzopf
Attorney, Agent, or Firm—Eyre, Mann, Lucas & Just

[57] ABSTRACT

A wheel slip control system generates one level of brake relief when a fixed threshold of wheel deceleration is exceeded. The system generates a second level of brake relief when a variable threshold, dependent upon both deceleration and velocity, is exceeded. A fixed acceleration threshold circuit monitors wheel acceleration during brake relief. Under normal road and load conditions, where wheel acceleration is great enough to exceed the fixed acceleration threshold, termination of brake relief is initiated by the increase in wheel velocity past a variable reference threshold which has a fixed part and a variable part. The fixed part is an a priori prediction of the minimum vehicle velocity decrease under normal stopping conditions. The variable part is dependent on wheel acceleration alone. When the acceleration threshold is not exceeded, as with slippery roads or very light loads, termination of brake relief is delayed until wheel acceleration decreases to a low value. This allows the wheel velocity to come up to approximately full vehicle speed before allowing brake re-application. A brief re-energization of the first level of brake relief, performed after a brief delay, reduces the tendency of the vehicle wheels to hop and bounce.

6 Claims, 7 Drawing Figures

FIG. 2

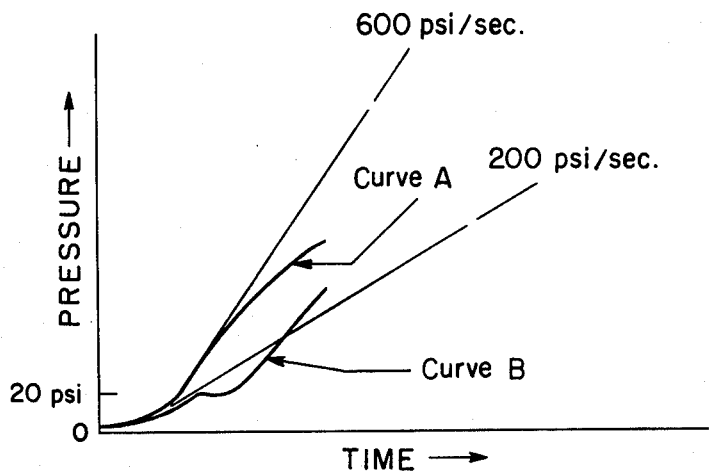

Curve A – Standard production skid control pressure reapplication.
Curve B – Re-application with brief S1 energization.

FIG. 5  NORMAL WHEEL REACCELERATION

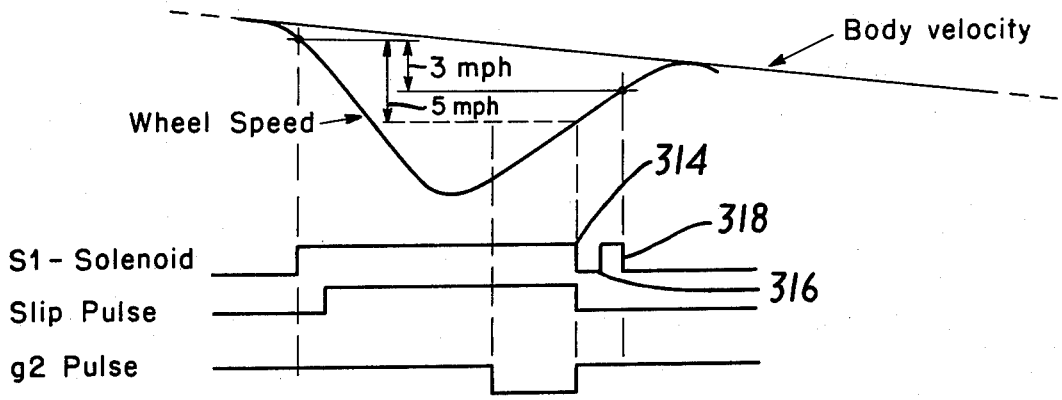

g2 is present only if wheel reacceleration is greater than g2 reference, g2 is reset by termination of slip pulse and predictive mode of pressure reapplication is retained.

FIG. 6
SLIPPERY PAVEMENT

Predictive Mode Ignored and Pressure Reapplication is by end of wheel reacceleration only.

g2 is latched by Strobe Pulse because g2 was not present at termination of slip pulse.

DRY PAVEMENT

SLIPPERY PAVEMENT

WHEEL SLIP CONTROL SYSTEM ADAPTED TO USE ON LOW COEFFICIENT SURFACES

BACKGROUND OF THE INVENTION

In addition to supporting a vehicle and maintaining wheel alignment, a vehicle suspension directs and distributes the resultant reaction forces from vehicles' braking system during braking. The simpler suspensions redirect brake reaction forces into the vehicle chassis using the vehicle body's normal weight to oppose the generated braking reaction forces.

It is known that such suspensions tend to bounce during skid control stops when the vehicle is empty or lightly loaded. These suspensions are highly susceptible to interacting together with skid control systems in such a way that bounce is sustained for the duration of the skid control stop. Stopping distances increase (due to decreased normal force available during a bounce) and susceptibility of vehicle and cargo to damage is increased.

As observed in films documenting bounce, several modes of suspension-skid control-wheel system behavior were evident in a tandem axle trailer:

a. With the first application of vehicles's brakes, all four wheels decelerate, but not necessarily to lock, and
b. the skid control system responds by releasing air from brake chambers, allowing wheels to recover.
c. Upon recovery of wheels to body velocity, the skid control system allows brakes to be reapplied, but all wheels this time seem to decelerate simultaneously to lock.
d. Just as the wheels of both axles lock, the trailer container moves upward, and in the extreme case, takes the bogie and its wheels with it off the ground. Air again is exhausted from brake chamber, releasing brakes due to lock, and
e. when the wheels reach the ground again on impact, skid control allows brakes to be reapplied immediately. This again lifts the container and trailer bogie, repeating step c, and in this way bounce is sustained for duration of the stop.

In addition, such suspensions also contribute to synchronous behavior during skid control cycling. Decreased traction, usually on the front axle, due to interaxle load shift while braking causes momentary loss of front tandem axle traction. This loss of traction causes rapid deceleration of front wheels in such a way that wheels usually snap to a lock, generating a force impulse that has to be absorbed by the vehicle body via suspension. With the upward motion of the vehicle body, these forces impart simultaneous decreased normal forces to the rear tandem causing loss of rear road traction, thus synchronizing the rear wheels with the fronts during wheel deceleration. This behavior aggravates bounce by synchronizing all the peak forces developed in front and rear tandem braking system.

SUMMARY OF THE INVENTION

The present invention is adapted for use with any wheel slip control system which monitors wheel velocity and generates a brake-relief signal when certain conditions of the monitored velocity or of other measured or derived kinematic data are satisfied. For purposes of description, and not as a limitation, the present invention is shown functionally related with a wheel slip control system as described in U.S. Pat. No. 3,951,467. In the referenced U.S. Patent, the decrease of the velocity of a selected wheel from the time a predetermined deceleration threshold has been exceeded by that wheel is monitored to determine if a predetermined increment $\Delta v$ has been exceeded, at which time a sharp reduction in brake line fluid pressure is effected. The reference increment of wheel speed $\Delta v$ is defined by (1) the value of wheel speed at the time said deceleration threshold is exceeded and (2) a reference signal which is continuously variable and in direct relationship to (a) both wheel speed and the rate of change of wheel speed during periods of wheel deceleration and (b) only to the rate of change of wheel speed during periods of wheel acceleration.

The present invention provides a brief re-energization of brake relief during the brake re-application period to limit the rise rate of brake pressure. This reduces hop and bounce. By slowing the rate of pressure re-application during skid control stops, the vehicle suspension components are allowed to reach equilibrium position without the harshness normally accompanying fast pressure and torque rise rates. Although the slowing of pressure rise rate can be achieved by mechanical means, such as by orificing control lines, electronic means is preferable. Electronic means allows the retention of the reliability of the present air system because orificed passageways tend to plug with air system contamination. Also, the apply and release timing requirements are not affected with implementation of rise rate slowing by electronic means.

In an empty vehicle, very low brake pressures are required to have wheels decelerating to lock, especially on low coefficient surfaces. The brief re-energization maintains pressure low (in the 20 psi region) for an additional 50 msecs so that pressure over-shoot, the amount of pressure above the tires' skid pressure after the skid control logic's command for pressure release, is minimized. This over-shoot is inherent in the control lines and mechanical limitations of valves and plumbing system. Maintaining pressure in this 20 psi region substantially reduces over-shoot for such stopping conditions resulting in shallower wheel slip and, thus, greater lateral stability. Should this pressure be insufficient to decelerate wheels, pressure continues to rise after the brief S1 re-energization at a rate slightly slower than the normal skid control re-application until the next skid control cycle. It has been found empirically that the region of 20 psi is the most suitable portion of the pressure rise characteristic that this leveling off be placed for minimization of vehicle bounce with braking systems.

The lateral stability on very low coefficient surfaces is further enhanced by additional circuitry which selects a pressure-re-application-only-at-the-end-of-re-acceleration mode. Earlier skid control systems were somewhat inefficient with extremely low surface coefficient surfaces (0.2 – 0.1 u) and wheels would cycle deeply due to pressure over-shoots and system delays. In addition, in the example wheel slip control system the slip compensation method of predicting wheel speed recovery relied on incremental speed decrease of at least 3 mph of vehicle velocity between successive skid control cycles. On trailer only brake applications with unladen vehicles on low coefficient surfaces, skid control efficiency diminished with increased slip because this minimum decrement was not achieved on such stops. As a result the actual body velocity deviates from the predicted body velocity. If wheel re-acceleration is less than a predetermined level, indicative of low traction because of low coefficient surface and/or unladened vehicle, then the re-application-only-after-end-of-re-acceleration mode is selected. This allows the wheel to continue accelerating until the measured or calculated acceleration falls below a small magnitude. In this way, brake re-application is delayed until the monitored wheel returns to approximately vehicle speed as sensed by the wheel acceleration decreasing to near zero.

BRIEF DESCRIPTION OF THE DRAWINGS

FIG. 2 shows curves of pressure rise rate versus time.

FIG. 5 shows the performance of the example wheel slip control system on dry pavement including the present invention.

FIG. 6 shows the performance of the example wheel slip control system on slippery pavement including the present invention.

DETAILED DESCRIPTION OF THE PREFERRED EMBODIMENT

Figure 1:
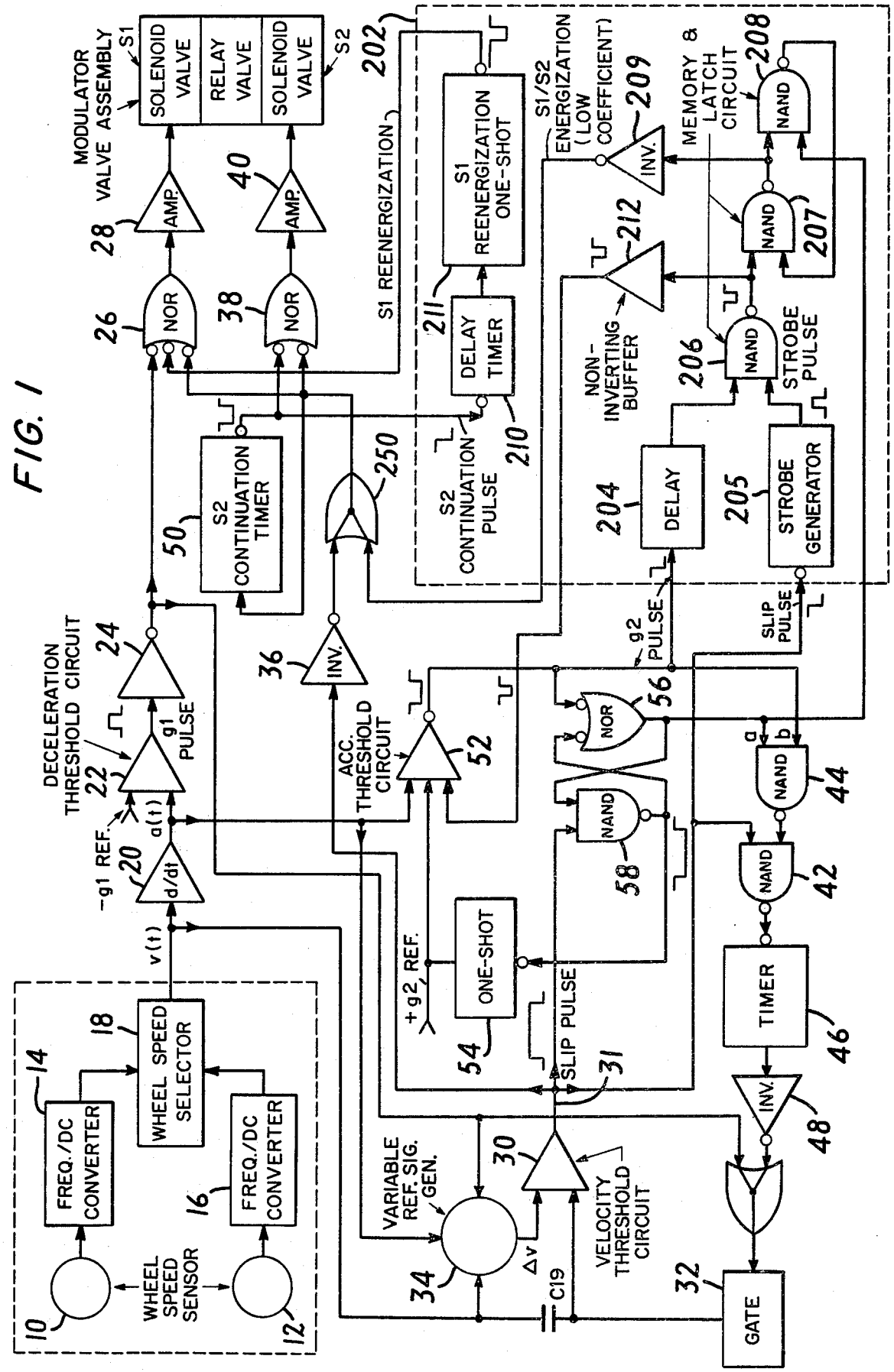
FIG. 1 shows the present invention connected to an example wheel slip control system. The present invention is set off in a heavy dashed box marked 202.

FIG. 1 shows an embodiment of the present invention 202 set off in a dashed box and connected to an example wheel slip control system such as shown and fully described in U.S. Pat. No. 3,951,467. It is to be understood that the present invention, enclosed within the dashed box 202, can advantageously be used with any wheel slip control system which measures velocity and generates one or more electrical signals which are used to relieve braking pressure upon the detection of a predetermined combination of conditions. In order to facilitate full disclosure of the present invention, the operation of the example wheel slip control system will be described insofar as it provides signals to, or receives signals from the present invention.

Briefly, the example wheel slip control system provides a first level of brake relief through energization of solenoid S1 when a predetermined value of deceleration is attained. The system provides a second more intense level of brake relief through energization of solenoid S2 when a predetermined combination of wheel velocity and deceleration are simultaneously attained.

Energization of solenoids S1 and S2 is maintained until a predetermined combination of wheel velocity and acceleration is attained. At the end of the commanded energization period, S2 continuation timer 50 causes solenoid S2 to remain energized whereas solenoid S1 is deenergized. During the energization of S2 and deenergization of S1, a precipitous rise in brake chamber pressure can take place.

Referring to FIG. 2, curve A shows a standard pressure re-application with S2 solenoid energized and S1 solenoid deenergized at time $t=0$. Pressure in the chamber rises at a rate of 600 psi/sec (during the first 20 psi of rise — which is the most critical with respect to bounce). This rise rate is fast enough to excite the vehicle's suspension in the manner described.

A precisely timed S1 re-energization places a kink in curve B of FIG. 2. The brief S1 re-energization serves to (1) provide additional time for suspension components to reach equilibrium and (2) reduce pressure rise rate during the first, but most critical 20 psi of pressure re-application. This reduction of rise rate results in a smoother re-application of brakes and the generation of lower peak brake reaction forces that have to be absorbed by the vehicle and suspension.

Figure 3:
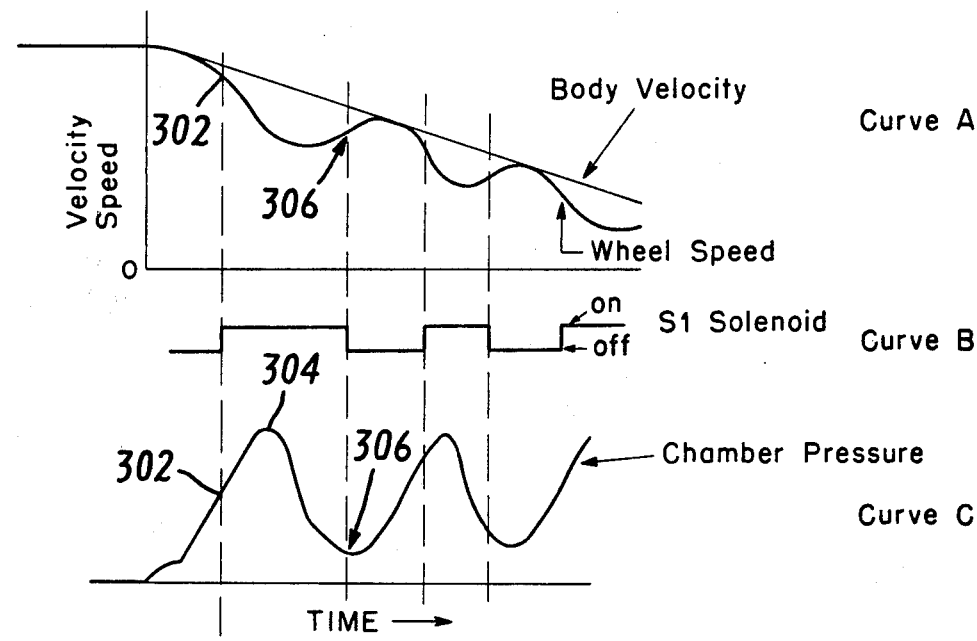
FIG. 3 shows the performance of the example wheel slip control system on dry pavement not including the present invention.
Figure 4:
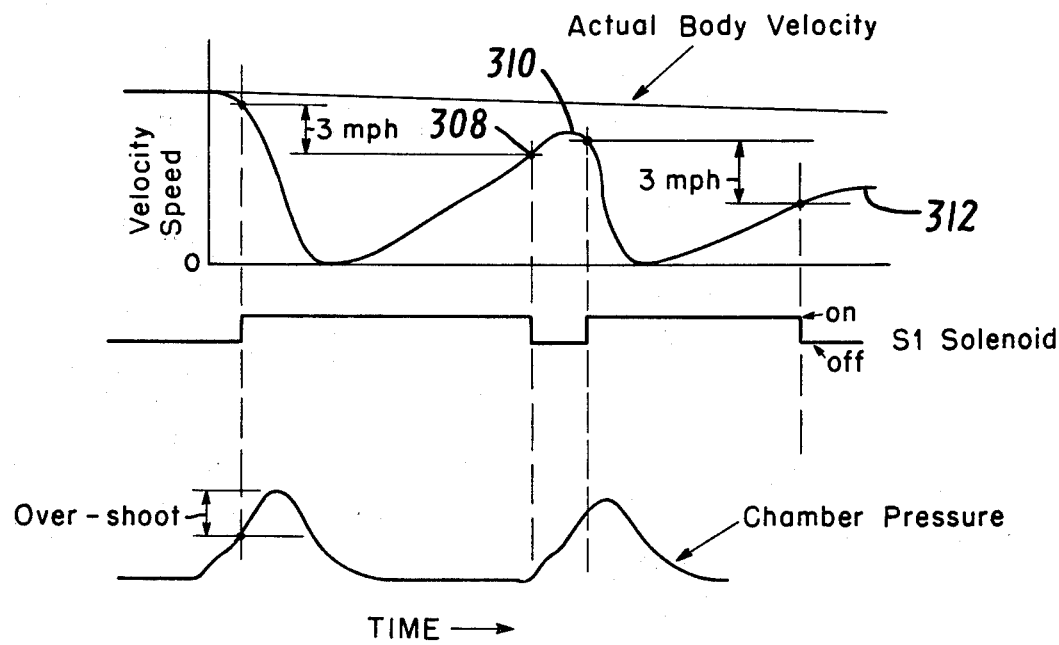
FIG. 4 shows the performance of the example wheel slip control system on slippery pavement not including the present invention.

The problem arising in low friction coefficient stops is illustrated in FIGS. 3 and 4. In a high-coefficient stop, as shown in FIG. 3, the wheel slip solenoid S1 is energized at point 302 on the body velocity and wheel speed curves in A. Note that the chamber pressure in curve C continues to rise after energization of S1 until time 304 due to the delay inherent in hydraulic devices. At time 306, solenoid S1 is deenergized as shown in curve B. The chamber pressure quickly begins to rise. Note that the brake re-application initiated by the deenergization of solenoid S1 takes place before the wheel speed in curve A increases to match the body velocity. This anticipation is necessary under normal conditions to attain optimum system performance.

In a low coefficient stop, as shown in FIG. 4, the depth of skid is markedly greater than in the normal case; decreasing to lock in the example shown. Also, the time taken to spin up the wheel after brake relief begins is markedly increased. In the example wheel slip control system of FIG. 1, a fixed velocity decrement, for example 3 mph, is predicted for each cycle of the wheel slip control system. When the monitored wheel has spun up to the predicted 3 mph below the point at which solenoid S1 was energized, solenoid S1 is deenergized at time 308. Due to the low coefficient condition, however, the actual body velocity has not decreased the predicted increment at the first peak of wheel speed 310. An additional predicted decrement is added in the next cycle and produces an even lower second peak at 312. The difference between the wheel speed peak and the body velocity is greater after the second wheel slip control cycle than after the first. The persistent excessive depth of wheel slip in this condition increases stopping distance and degrades lateral stability.

FIGS. 5 and 6 show the improvement obtained with the instant invention. Referring first to FIG. 5, the negative g2 pulse occurs in a skid-control when a fixed value of acceleration is exceed. The value of acceleration chosen to trigger the g2 signal in the illustrative wheel slip control system is 3 gees (3 × 32.2 ft/sec/sec) although other values could be chosen for systems having varying dynamic characteristics. The presence of the g2 pulse indicates that a normal coefficient of friction exists. Under normal coefficient, wheel slip control by solenoid S2 is terminated at least a fixed increment below the wheel speed at which it was initiated. Note that solenoid S1 energization and the g2 pulse terminate simultaneously at time 314. After a short delay at time 316, solenoid S1 is re-energized for a short time and is again deenergized at time 318. By the short re-energization of solenoid S1, the slope of the wheel speed curve is decreased so that it approaches the body velocity curve more nearly as asymptotically than was shown in FIG. 3. The consequent reduced rate of brake re-application is less violent as was previously explained.

FIG. 6 shows the operation of the present invention on a slippery pavement. Due to the slipperyness of the pavement, the wheel spin-up acceleration remains below the value that is required to cause the generation of a negative g2 pulse. At the end of the solenoid S2 signal, as shown by the slip pulse at time 320, solenoid S1 remains energized instead of being deenergized as in the normal case in FIG. 5. Solenoid S1 remains energized until time 322 at which time the wheel acceleration has decreased to a very low value. This ocurrs when the wheel speed has spun up to very close to the body velocity. The S1 reenergization pulse further limits the rate of brake reapplication to improve wheel slip control.

Referring again to FIG. 1, first and second wheel speed signals are generated by first and second wheel speed sensors 10 and 12, which are of a type well known in the art. The first wheel speed sensor 10 is connected to a first wheel to generate a train of pulses varying in frequency in direct proportion to wheel speed. This pulse train is fed into a frequency/DC converter 14 which in turn generates a variable-amplitude DC signal which is a first wheel speed analog signal. In like manner, a second wheel speed analog signal is generated by wheel speed sensor 12 and frequency/DC converter 16. The wheel speed analog signals may be generated by various other means which are known or may become known in the art. The first and second wheel speed analog signals are fed into wheel speed selector circuit 18, which preferably operates to pass only the signal representative of the lowest wheel speed. Although different criteria may be applied, e.g., select-high or average, the select-low approach has been found to afford optimum results, particularly in terms of vehicle stability. Thus, a signal $v(t)$ which is proportional to the speed of the slowest-rotating wheel is provided at the output of wheel speed signal selector 18. This signal is fed to differentiating circuit 20, which in turn generates a signal $a(t)$ proportional to the rate of change of the wheel speed signal $v(t)$. The rate-of-change signal $a(t)$ forms the variable input to deceleration threshold circuit 22, which compares $a(t)$ to a deceleration reference signal $-g$ which represents a predetermined value of wheel deceleration, preferably $-1g$. When the rate-of-change signal $a(t)$ exceeds the reference signal $-g$, a variable-width, positive-going g1 pulse of constant amplitude is generated by deceleration threshold circuit 22. This deceleration g1 pulse is fed to inverter 24, which responds by applying a negative-going pulse to an input channel of NOR gate 26. A positive output pulse is consequently generated by NOR gate 26 and amplified by power amplifier 28 to energize solenoid valve S1, thereby effecting relief of brake line fluid pressure in the brake system of the associated vehicle. In a mild skid, the brake relief effected by the energization of solenoid valve S1 is sufficient to stop the skid. The g1 pulse and the energization of solenoid valve S1 are terminated as soon as the deceleration no longer exceeds $-1g$.

Variable reference signal generator 34 and velocity threshold circuit 30 are effective in more severe skid conditions to generate a second level of brake relief in addition to that provided by solenoid valve S1.

Prior to the generation of the g1 pulse by deceleration threshold circuit 22, gate 32 provided a ground potential at the junction of sample-and-hold capacitor C19 and one input of velocity threshold circuit 30. Sample-and-hold capacitor C19 is consequently charged to the instanteous value of the velocity signal $v(t)$. When the inverted g1 pulse is connected from inverter 24 to gate 32, gate 32 is switched to present an open circuit to the junction of capacitor C19 and the input to velocity threshold circuit 30. Sample-and-hold capacitor C19 contains a reference value $v(o)$ of $v(t)$ at the instant of switching and remains charged to the value of $v(o)$ which existed at the instant of switching for the duration of the g1 pulse. During subsequent changes in the velocity signal $v(t)$, sample-and-hold capacitor C19 subtracts the stored reference value of the velocity signal $v(o)$ from the instantaneous value of the velocity signal $v(t)$. Consequently, the signal connected from sample--and-hold capacitor C19 to the velocity threshold circuit 30 consists of the difference between the instantaneous value of the velocity signal $v(t)$ and the stored reference value of the velocity signal $v(o)$.

The inverted g1 deceleration pulse from inverter 24, connected to one input of variable reference signal generator 34 performs internal switching which enables the variable reference signal generator 34 to combine functions of both the velocity ($v(t)$) and acceleration $a(t)$ signals into a single variable reference signal $\Delta v$ and to connect the result to one input of velocity threshold circuit 30. For purposes of illustration and not as a limitation, during deceleration, the variable reference signal $\Delta v$ can be made up of a fixed minimum of 3 miles per hour plus a deceleration function of 1 mile per hour per g of deceleration plus a velocity function of 1 mile per hour per 10 miles per hour of velocity. The sense of the deceleration function is opposite to the sense of the fixed and velocity terms during deceleration. Thus, the deceleration contribution of 1 mile per hour per g is subtracted from the fixed minimum and variable velocity contributions to arrive at the final value for the variable reference signal $\Delta v$. For example, a stop beginning at 60 mph with a deceleration of 3 gees would produce a variable reference signal $\Delta v$ as follow:

| | |
|---|---|
| Fixed increment | −3 mph |
| Velocity increment (60/10) | −6 mph |
| Deceleration increment | +3 mph |
| Variable reference increment $\Delta v$ | −6 mph |

The above method of generating the variable reference increment $\Delta v$ during deceleration satisfies the empirically determined rules that, at high speed, later application of skid control produces a quicker stop whereas with large deceleration, earlier application of skid control produces a quicker stop.

As $v(t)$ decreases due to the application of reduced braking force, velocity threshold circuit 30 compares the wheel speed difference signal $v(t)-v(o)$ to the variable reference signal $\Delta v$.

If the wheel speed difference $v(t)-v(o)$ falls below the variable reference signal $\Delta v$, velocity threshold circuit 30 generates a variable-width, positive-going slip pulse of constant amplitude. This slip pulse is applied to the input of inverter 36, which in turn applies a negative-going pulse through wired OR gate 250 to an input of NOR gate 38 and to an input of NOR gate 26. A positive output pulse in consequently generated by NOR gate 38 and amplified by power amplifier 40 to energize solenoid valve S2, thereby effecting a second level of relief of brake line fluid pressure in addition to the brake relief already being accomplished by the energization of solenoid valve S1.

The positive slip pulse from velocity threshold circuit 30 is also applied to NAND gate 42, which normally receives a positive signal from NAND gate 44 at its other input. Consequently, a negative pulse is produced at the normally-high output of NAND gate 42. Timer 46 is actuated by the negative pulse from NAND gate 42 to provide a positive input to inverter 48, which in turn applied a negative input pulse to gate 32 as long as its positive input endures for up to a predetermined maximum period of time, preferably about 1.6 seconds. Thus, the slip pulse through NAND gate 42 and timer 46 to gate 32 can continue to enable the passage of $v(t) - v(o)$ to velocity threshold circuit 30 after the deceleration pulse from deceleration threshold circuit 22 is terminated.

Solenoid valve S1 has a service inlet and a service exhaust, and solenoid valve S2 has a service exhaust only. With this type of modulator valve assembly, the system is capable of the following modes of operation:

1. S1, S2 both deenergized: normal service position, rapid application rate of brake line fluid pressure to control chamber of modulator valve assembly.
2. S1 energized, S2 deenergized: slow exhaust rate from control chamber of modulator valve assembly.
3. S1, S2 both energized: rapid exhaust rate from control chamber of modulator valve assembly.
4. S1 deenergized, S2 energized: reduced application rate of brake line fluid pressure.

The preceding modes of operation are desirable in order to limit the rise rate of brake line fluid pressure and the peak valve thereof when operating a vehicle on surfaces having a low coefficient of friction $\mu$ (mu). This slower application and peak-limiting of the brake line fluid pressure is achieved by creating a deliberate leak in the modulator valve assembly. With S1 deenergized and S2 energized, some of the incoming (service) air passing unvented through solenoid valve S1 is bled off by S2. Both the rate at which brake line fluid pressure rises and the balanced-off pressure are determined by the ratio of the service air inlet orifice and the outlet orifice of solenoid valve S2.

With both solenoid valves S1 and S2 energized, brake line fluid pressure decreases sharply and allows the wheel to stop decelerating and then to re-accelerate. As soon as the deceleration becomes less than $-1g$, the $g1$ pulse is terminated. The termination of the $g1$ pulse has no effect on solenoid valve S1 since this solenoid valve is held in the energized condition by the inverted slip pulse from inverter 36 at one input of NOR gate 26. The termination of the $g1$ deceleration pulse at one input of variable reference signal generator 34 causes internal switching therein which enables variable reference signal generator 34 to produce a variable reference signal $\Delta v$ which is a function of acceleration $a(t)$ alone. For purposes of illustration and not as a limitation, during acceleration, the variable reference signal $\Delta v$ can be made up of a fixed minimum of 3 miles per hour plus an acceleration function of 1 mile per hour per g of acceleration. The fixed and variable components of the variable reference signal $\Delta v$ are additive during acceleration. For example, for a re-acceleration rate of 2gs, a variable reference signal $\Delta v$ of $-5$ mph is generated as follows:

| | |
|---|---|
| Fixed increment | $-3$ mph |
| Acceleration increment | $-2$ mph |
| Variable reference increment $\Delta v$ | $-5$ mph |

In this condition, if the wheel speed $v(t)$ increases past the point that the wheel speed difference $v(t) - v(o)$ is less than, for example, 5 mph, then the velocity threshold circuit 30 is enabled to terminate the slip pulse output.

Assume for the following description that the termination of the slip pulse as described in the preceding has not occurred and that wheel re-acceleration is continuing. When the acceleration $a(t)$ of the monitored wheel received by acceleration threshold circuit 52 exceeds the acceleration reference signal $+g$ representing a predetermined value of wheel acceleration, preferably $+3gs$, a variable-width, negative-going $g2$ acceleration pulse of constant amplitude is generated by acceleration threshold circuit 52. Acceleration threshold circuit 52 contains a built-in hysteresis. Once it is triggered by the occurrence of an acceleration signal exceeding the $g2$ reference, a different and smaller threshold is established for termination of the $g2$ acceleration pulse. For example, once triggered by a 3g acceleration signal, the threshold may change to 0.5g requiring a reduction in acceleration to this smaller magnitude before terminating the $g2$ pulse. The $g2$ acceleration pulse sets the flip-flop circuit formed by NOR gate 56 and NAND gate 58, causing the output of NOR gate 56 to go high, the coincidence of which with the slip pulse causes the output of NAND gate 58 to go low, thereby latching the output of NOR gate 56 against further changes in output of the acceleration threshold circuit 52. The output of NAND gate 58 is fed as an actuating input to timer 54, which provides a positive feedback signal of approximately 180 milliseconds duration to acceleration threshold circuit 52 to insure that the acceleration pulse has at least this minimum duration. This feature, along with the hysteresis in acceleration threshold circuit 52, prevents spurious outputs from the wheel speed sensors 10 and 12 (due to wheel vibration during braking) from causing rapid alternating or chattering of the output of acceleration threshold circuit 52, which would undesirably interrupt the skid control cycle. Due to the inherent time delay between the application of the negative $g2$ acceleration pulse at one input of NOR gate 56 and the appearance of its high or positive output, the negative acceleration pulse will be received by NAND gate 44 just prior to the positive output of NOR gate 56. Thus, the output of NAND gate 44 will remain at its normal high, thereby continuing to supply a high input to NAND gate 42. Consequently, timer 46 remains actuated until the first to occur of (1) the slip pulse is terminated by the comparison in velocity threshold circuit 30 or (2) the $g2$ acceleration pulse from acceleration threshold circuit 52 is terminated or (3) timer 46 has run for its predetermined period of time, preferably about 1.6 seconds. The occurrence of any one of these events will remove the gating signal from gate 32 and thereby halt the comparison function carried out by velocity threshold circuit 30.

Since the slip pulse constitutes a positive or high input to NAND gate 58, along with the positive output of NOR gate 56 produced in response to the negative acceleration pulse, the termination of the slip pulse will cause the output of NAND gate 58 to return to its normal high, thereby removing a low input from NOR gate 56. If the acceleration pulse has not yet terminated, the output of NOR gate 56 will remain high, thus maintaining opposite inputs to NAND gate 44 which in turn maintains its high output. However, with the termination of the slip pulse, the other necessary input is removed from NAND gate 42, thereby causing its output to go high and reset timer 46, the output of which goes low when the output of NAND gate 42 goes high. Thus, inverter 48 applies a positive input to gate 32, causing it to shunt $v(t)$ to ground at the input of velocity threshold circuit 30. The same result is obtained if the $g2$ acceleration pulse terminates prior to the slip pulse. With increasing wheel velocity and decreasing wheel acceleration, the $g2$ acceleration pulse will be terminated. Upon termination of the negative-going $g2$ acceleration pulse, one input of NOR gate 56 goes high. However, the other input of NOR gate 56 is held low by the output of NAND gate 58. Thus, the output of NOR gate 56 remains high after termination of the negative $g2$ acceleration pulse. Thus, NAND gate 44 has two high inputs, causing its output to go low. A high input is thus removed from NAND gate 42, causing its output to go low and thereby reset timer 46 and remove the gating signal from gate 32. Thus, termination of the $g2$ acceleration pulse causes termination of the slip pulse, thereby removing the other input from NAND gate 42. The termination of the slip pulse through inverter 36 and wired OR gate 250 to one input of NOR gate 26 allows solenoid valve S1 to become deenergized.

The termination of the slip pulse also causes S2 continuation one-shot 50 to initiate generation of a negative output pulse, the duration of which is nonlinearly dependent upon the duration of the slip pulse. Thus, solenoid valve S2 is maintained in an energized condition for a short, variable period of time after termination of the slip pulse. After S2 continuation one-shot 50 runs out, solenoid valve S2 is deenergized and the full cycle is completed. As the system repetitively re-cycles, decreasing initial values $v(o)$ of the decreasing wheel speed analog signal $v(t)$ are employed in combination with the continuously-variable output of reference signal generator 34 to define the variable reference increment of wheel speed $\Delta v$, within each cycle. Each cycle may include the generation of only a $g1$ deceleration pulse, or the generation of both $g1$ deceleration and slip pulses, or the generation of $g1$ deceleration, slip, and $g2$ acceleration pulses, depending upon a number of factors including vehicle characteristics, load size and distribution, and conditions at the tire-road interface.

The preceding completes the functional description of the example wheel slip control system with which the present invention, shown set off in the dashed box 202, is intended to work. The functional description shows the derivation and nature of all signals which interact with the present invention. If more detailed description of the internal operation of the functional circuits is desired, U.S. Pat. No. 3,951,467 contains schematic diagrams and description thereof including the values of circuit components. The remainder of this disclosure is devoted to describing the contents of the dashed box 202 in FIG. 1 and relating the activities therein to their effects on the remainder of the system.

The function of the improvement is to determine whether or not the $g2$ acceleration pulse exists at the time the slip pulse terminates. If the $g2$ pulse does exist at that time, indicating that normal friction coefficient exists, energization of solenoid S1 is terminated and energization of solenoid S2 is continued for a variable time by a negative pulse output of S2 continuation one-shot 50 which is triggered into operation by the trailing edge of the slip pulse in the same manner as the system without the improvement. A short time after deenergization of solenoid S1, it is re-energized for a short pulse and then is again deenergized.

Strobe generator 205 generates a single narrow positive strobe pulse upon receiving the negative-going trailing edge of the slip pulse. The narrow positive strobe pulse is connected to one input of NAND gate 206. Delay 204, receiving the negative $g2$ pulse at its input, provides an inhibit to the second input of NAND gate 206. Thus the presence of the $g2$ pulse at the input of delay 204 at the time the slip pulse terminates prevents the strobe pulse from the reaching succeeding circuits.

The negative S2 continuation pulse is also connected to delay timer 210. Delay timer 210 imposes a delay of, for example, 50 milliseconds to the S2 continuation pulse before connecting an inverted output to the input of S1 re-energization one-shot 211. The delay time of delay timer 210 may be varied from 50 milliseconds but the value of 50 milliseconds has been found effective to control hop and bounce. S1 re-energization one-shot generates a negative-going 50 millisecond pulse which, connected through NOR gate 26 and amplifier 28 causes solenoid valve S1 to be re-energized for this period. The combination of the short delay and short re-energization of solenoid valve S1 causes the reduction in initial pressure rise rate shown in curve B of FIG. 2.

When the negative $g2$ pulse does not exist at the end of the slip pulse, indicating a low-coefficient surface, delay 204 provides an enable input to one input of NAND gate 206 at the time the strobe pulse is connected to its other input by strobe generator 205. Delay 204 delays any change in its output until well past the time that the strobe pulse is effective to perform its function.

The strobe pulse is inverted in NAND gate 206 and is applied as a short negative input at a reference input of acceleration threshold circuit 52. The momentary reduction of the reference input to zero triggers the acceleration threshold circuit 52 into producing its negative-going $g2$ output signal. As previously described, once acceleration threshold circuit 52 has been triggered, the hysteresis within the circuit reduces to near zero the value of acceleration required to terminate the $g2$ acceleration pulse.

Due to the prior non-occurrence of the $g2$ pulse, the flip-flop circuit formed by NOR gate 56 and NAND gate 58 remains untriggered. Upon the termination of the slip pulse at one input of NAND gate 58, the flip flop can no longer be triggered. Thus NOR gate 56 receives a constant high from NAND gate 58. Consequently, NOR gate 56 operates as a simple inverter for the negative $g2$ pulse from acceleration threshold circuit 52. The positive output from NOR gate 56 arrives at one input of NAND gate 208 before the end of the strobe pulse. Thus the negative inverted strobe pulse from NAND gate 206 inhibits one input of NAND gate 207. The resulting high output of NAND gate 207 enables one input of NAND gate 208. The positive inverted $g2$ pulse arrives at the second input of NAND gate 208 during the strobe pulse. The output of NAND gate 208 goes low. The low output of NAND gate 208 inhibits one input of NAND gate 207. The transition of the output of NAND gate 208 from high to low latches NAND gates 207 and 208 into the condition described until the end of the positive inverted $g2$ pulse at one input of NAND gate 208.

The high output of latched NAND gate 207 is inverted in inverter 209 and connected in parallel to the inputs of NOR gates 26 and 38. This signal causes the continued energization of solenoids S1 and S2 for as long as acceleration threshold circuit continues to provide the g2 output. The g2 output continues until the acceleration signal $a(t)$ connected from differentiating circuit 20 to acceleration threshold circuit 52 remains greater than a small value, preferably 0.5g.

When the acceleration signal $a(t)$ falls below 0.5g, the high inverted g2 pulse previously connected from NAND gate 208 is replaced by a low. The output of NAND gate 208 goes low thus unlatching NAND gates 207 and 208. The output of NAND gate 207 goes low. The resulting high output of inverter 209 removes the low solenoid valve S1 and S2 energization signal from NOR gates 26 and 38 respectively. Solenoid valve S1 becomes deenergized. The brake relief formerly provided by solenoid valve S1 is terminated. The positive-going trailing edge of the signal from inverter 209 triggers S2 continuation timer 50 into generating a negative S2 continuation pulse whose length is non-linearly related to the length of its input. The S2 continuation pulse is connected to one input of NOR gate 38 and thus continues the energization of solenoid valve S2 for a variable length of time. The leading edge of the S2 continuation pulse causes delay timer 210 to begin a fixed timing cycle of any length but preferably about 50 milliseconds. At the end of its timing cycle, delay timer 210 connects a trigger signal to S1 re-energization one-shot 211. S1 re-energization one-shot 211 thereupon generates a negative output pulse of fixed duration, preferably about 50 milliseconds which is connected to one input of NOR gate 26. By this delay and re-energization sequence, solenoid valve S1 is deenergized for about 50 milliseconds following the end of the g2 pulse, then re-energized for about 50 milliseconds, then deenergized again to complete the participation of solenoid valve S1 in the brake relief in this wheel slip control sequence.

Figure 7:
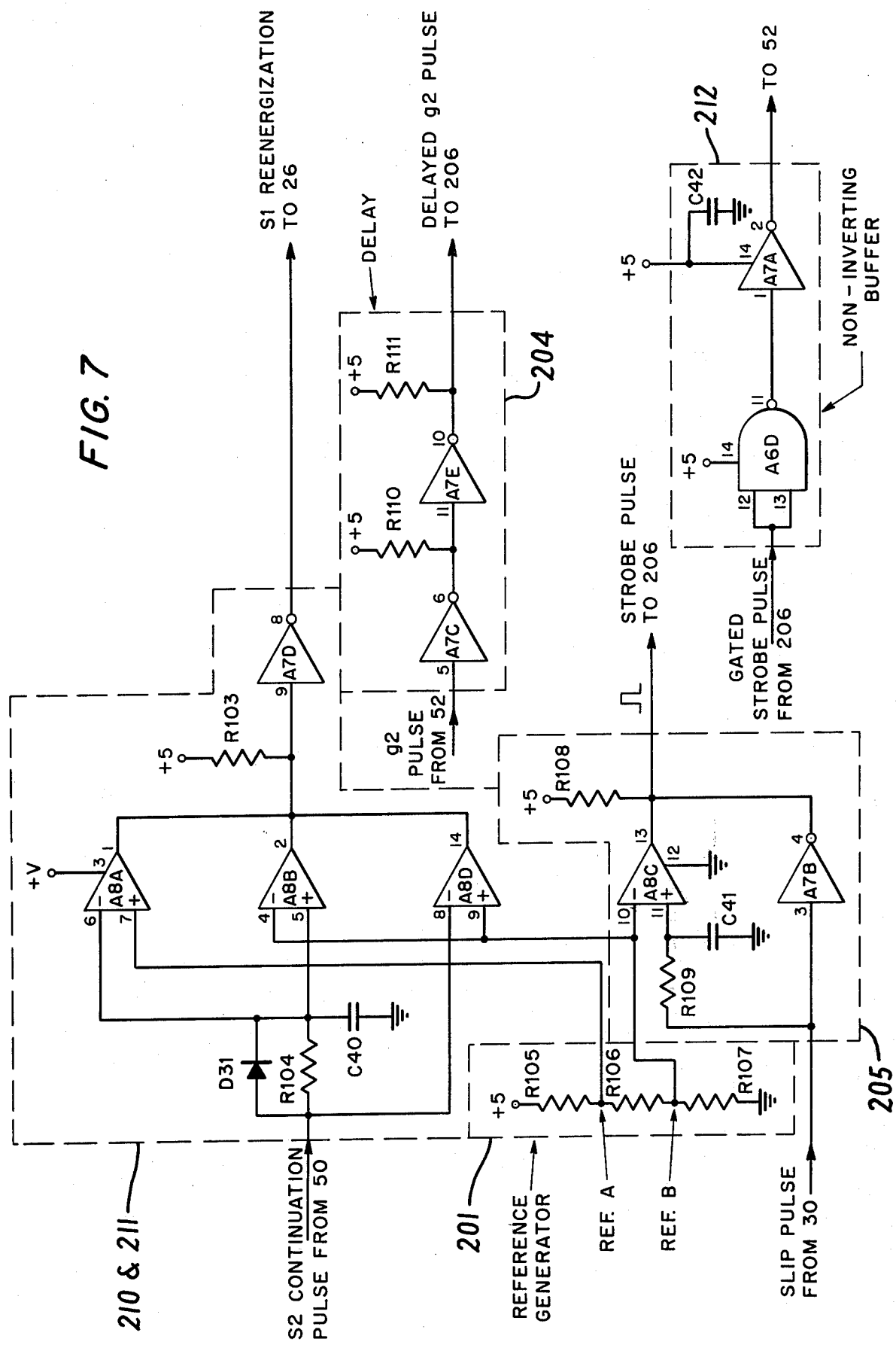
FIG. 7 shows a detailed schematic diagram of the elements of the present invention insofar as the elements are not fully disclosed in FIG. 1.

The detailed schematic diagram of the circuits comprising the present invention in dashed box 202 are shown in FIG. 7 only insofar as they are not fully disclosed in FIG. 1. All parts of the present invention in dashed box 202 which are not shown in FIG. 7 are identified by manufacturer's part number in the list of parts included as a part hereof. The parts values for the example wheel slip control system are contained in U.S. Pat. No. 3,951,467.

Non-inverting buffer 212 consists of NAND gate A6D having its two inputs connected together, and thus operating as an inverter, followed by inverter A7A.

Delay 204 consists of inverter amplifiers A7C and A7E in series. The inverter amplifiers A7C, A7E are of a type which have a combined delay between input and output sufficient to allow the completion of the switching function in other circuits, as previously described, before its output responds to a change in its input.

Reference generator 201 is a resistive voltage divider consisting of resistors R105, R106 and R107 which produces two reference voltages, A and B, used to establish switching times in delay timer 210, S1 re-energization one shot 211, and strobe generator 205.

Delay timer 210 and S1 re-energization one-shot 211 will be described together. Prior to the onset of the negative output of the S2 continuation one-shot 50, timing capacitor C40 is fully charged to positive logic voltage through forward biased charging diode D31. The output of A8A is low due to the logic voltage at pin 6 exceeding voltage reference A at pin 7. The output of A8B would be high except for the fact that its output is clamped to low by the low output of A8A. When the low S2 continuation pulse begins, A8A remains in its original condition with a low output until timing capacitor C40 discharges through R104 sufficiently to reduce the voltage in C40 below voltage reference A.

The inputs of A8D are in condition for its output to be high except that its output is also clamped low by A8A. After approximately 50 milliseconds, the voltage across C40 has decreased to equal voltage reference A. A8A is turned on. The resulting high output unclamps the high outputs of A8B and A8D. Inverter A7D delivers a low S1 re-energization signal to NOR gate 26.

Timing capacitor C40 continues to discharge. When the voltage across timing capacitor C40 decays to the value of voltage reference B after an additional 50 milliseconds, the output of A8B switches from high to low thus clamping the outputs of A8A and A8D low. Inverter A7D removes the low S1 re-energization signal from one input of NOR gate 26 thus causing solenoid valve S1 to become deenergized. This condition persists until the end of the S2 continuation pulse at which time capacitor C40 charges almost instantly to full logic voltage through charging diode D31 and A8A provides a low clamp on the otherwise high outputs of A8B and A8D.

The strobe generator 205 generates a single positive strobe pulse upon receiving the negative-going trailing edge of the positive slip pulse. During the positive slip pulse, timing capacitor C41 charges to approximately the full positive logic voltage. The otherwise high output of A8C is clamped low by the output of inverters A7B. Immediately after the termination of the slip pulse, the resulting high output of inverter A7B unclamps the high output of A8C. A high strobe pulse is connected to one input of NAND gate 206. Timing capacitor C41 begins discharging through R109. When the voltage across C41 decays to equal voltage reference B, the output of A8C switches from high to low and clamps the output of inverter A7B low. This terminates the strobe pulse.

A parts list giving electrical values or manufacturer's part number of the parts of the present invention are given in the following tabulation.

| PARTS LIST | | | | |
|---|---|---|---|---|
| RESISTORS | | CAPACITORS | | DIODES |
| R103 | 22K | C40 | 4.7u | D31    IN914 |
| R104 | 20.5K | C41 | .01u | INTEGRATED |
| R105 | 12.1K | C42 | .01u | CIRCUITS |
| R106 | 7.87K | | | 206   MC849 (MOTOROLA) |
| R107 | 17.4K | | | |
| R108 | 22K | | | 207   MC849 (MOTOROLA) |
| R109 | 100K | | | 208   MC849 (MOTOROLA) |
| R110 | 22K | | | 209   MC7405P (MOTOROLA) |
| R111 | 22K | | | A6    MC849 (MOTOROLA) |
| | | | | A7    MC7405P (MOTOROLA) |
| | | | | A8    SC5135PK (MOTOROLA) |

It will be understood that the claims are intended to cover all changes and modifications of the preferred embodiments of the invention, herein chosen for the purpose of illustration which do not constitute departures from the spirit and scope of the invention.

What is claimed is:

1. In a vehicle having at least one monitored wheel and a wheel slip control system of the type wherein at least a wheel deceleration signal is used to trigger the energization of at least one level of brake relief and at least a wheel acceleration signal is used to trigger termination of energization of at least one level of brake relief, the improvement comprising:

a. means for re-energizing said at least one level of brake relief for a first fixed predetermined period of time; and b. means for delaying the operation of said re-energizing means for a second fixed predetermined period of time after the termination of said energization.

2. The improvement recited in claim 1 further comprising:

a. first means for sensing that the acceleration of said monitored wheel has remained continuously below a first predetermined acceleration threshold value at the time said termination trigger occurs;

b. second means for sensing when the acceleration of said monitored wheel falls below a second lower predetermined level of acceleration threshold value;

c. means for continuing said at least one level of brake relief past said termination trigger when the acceleration of said monitored wheel has remained continuously below said first predetermined acceleration threshold value; and d. means for terminating said at least one level of brake relief when the acceleration of said monitored wheel falls below said second lower acceleration threshold value.

3. The improvement recited in claim 2 wherein said first means for sensing comprises:

a. an acceleration threshold circuit operative to generate a first signal when said first predetermined acceleration threshold value is achieved;

b. a strobe generator operative at the termination of said energization to generate a strobe pulse;

c. means for delaying said first signal;

d. gating means operative in response to the simultaneous presence of a predetermined condition of said first signal and said strobe pulse to generate a pulse output; and e. switching means in said acceleration threshold circuit operative to cause the generation of said first signal upon receiving said pulse output.

4. The improvement recited in claim 1 wherein:

a. said means for delaying is a timer;

b. said means for re-energizing is a one-shot; and c. said one-shot is triggered into operation by the end of the timing cycle of said timer.

5. In a vehicle having at least one monitored wheel and a wheel slip control system of the type wherein at least a wheel deceleration signal is used to trigger the energization of at least one level of brake relief and at least a wheel acceleration signal is used to trigger termination of energization at least one level of brake relief, the improvement comprising:

a. first means for sensing that the acceleration of said monitored wheel has remained continuously below a first predetermined acceleration threshold value at the time said termination trigger occurs;

b. means for sensing when the acceleration of said monitored wheel falls below a second lower predetermined level of acceleration threshold value;

c. means for continuing said at least one level of brake relief past said termination trigger when the acceleration of said monitored wheel has remained continuously below said first predetermined acceleration threshold value; and d. means for terminating said at least one level of brake relief when the acceleration of said monitored wheel falls below said second lower acceleration threshold value.

6. The improvement recited in claim 5 wherein said first means for sensing comprises:

a. an acceleration threshold circuit operative to generate a first signal when said first predetermined acceleration threshold value is achieved;

b. a strobe generator operative at the termination of said energization to generate a strobe pulse;

c. means for delaying said first signal;

d. gating means operative in response to the simultaneous presence of a predetermined condition of said first signal and said strobe pulse to generate a pulse output; and e. switching means in said acceleration threshold circuit to cause the generation of said first signal upon receiving said pulse output.

* * * * *